Dec. 29, 1953     O. M. ANDERSON     2,664,002
COUPLING FOR DRINK MIXERS
Filed June 28, 1950
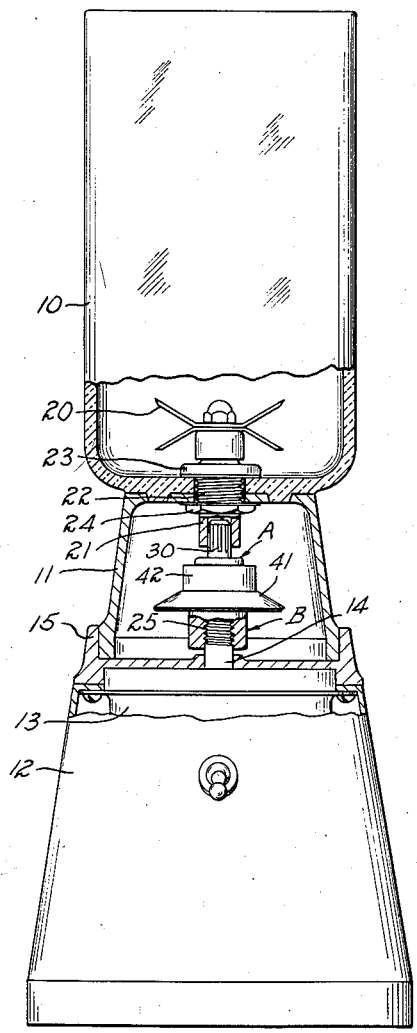
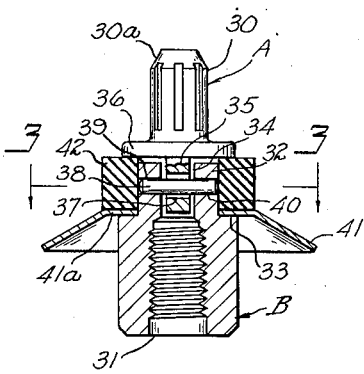
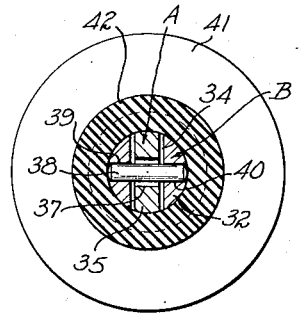
Inventor
OSCAR M. ANDERSON
By
Lindsey and Prutzman
ATTORNEYS Patented Dec. 29, 1953

2,664,002

UNITED STATES PATENT OFFICE 2,664,002

COUPLING FOR DRINK MIXERS

Oscar M. Anderson, New Britain, Conn., assignor to Landers, Frary and Clark, New Britain, Conn., a corporation of Connecticut Application June 28, 1950, Serial No. 170,899

2 Claims. (Cl. 64—6)

The present invention relates to a coupling for forming a detachable driving connection between substantially aligned shafts and having particular utility for use with a drink mixer or blender of the type including a vessel for the drink or beverage having an agitator which is adapted to be releasably coupled to the drive shaft of a motor.

In beverage mixers and blenders of the type to which the present invention relates, the agitator disposed in the container for the beverage is adapted to be driven or rotated at a very high rate of speed and it is imperative that the connecting means between the shaft of the agitator and the shaft of the motor will operate satisfactorily without undesirable vibration and noise not only at this very high rate of speed but also throughout the wide range of speeds encountered when the device is turned off and on. At the same time it is desirable to have some provision for universal movement of the coupling between the shafts to permit the shafts to be engaged and disengaged without difficulty, particularly when there is any misalignment of the shafts. In this connection it is desirable to have a coupling which will permit the manufacture of the beverage mixing or blending machine without the requirements for the close tolerances which would be necessitated in order to maintain the shafts in perfect alignment.

It is an aim of the present invention to provide a coupling for use between the agitator shaft and motor shaft of a beverage mixer or blender of the type referred to which will permit easy engagement and disengagement of the shafts despite misalignment thereof without at the same time introducing a disadvantage from the standpoint of vibration and noise when the shafts are operated throughout a wide range of speeds.

A more specific aim of the invention is to provide a universal coupling for use in the manner referred to which has incorporated therein a novel stabilizing and damping means which is effective to overcome undesirable vibration and other undesirable effects of unbalanced rotation at high speeds.

A further aim of the invention is to provide such a coupling which is of simple design and easy to fabricate and assemble whereby the advantages of the coupling may be obtained without a great increase in cost of manufacture.

A further aim of the invention is to provide a coupling which will provide the advantages referred to above and which at the same time, despite its simplicity and economy of construction and manufacture, will be sufficiently rugged to withstand hard usage over long periods of time without failure or need for replacement or repair.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

Fig. 1 is a front view partially in cross-section of a beverage mixer or blender provided with a shaft coupling embodying the present invention.

Fig. 2 is an enlarged cross-sectional view of the coupling.

Fig. 3 is a cross-sectional view taken along line 3—3 of Fig. 2.

Referring to the drawings, there is shown in Fig. 1 a beverage mixer or blender of the type which includes a container 10 for receiving the liquids and other materials to be mixed or blended. In the illustrative embodiment, container 10 is a glass receptacle provided with an inverted cup-like extension 11 adapted to seat on a base 12, the latter containing the prime mover of the device, i. e. an electric motor 13 having a drive shaft 14 extending upwardly within the cup-like extension 11. The bottom edge of the extension 11 is telescopically received within the flange 15 and is thereby properly centered on the base when in use, although easily removable therefrom.

As is conventional in beverage mixers of this type, the container 10 is provided with an agitator consisting of blades 20 fixed to a shaft 21 extending downwardly through an aperture in the base of the container. A journal for the shaft is provided by a threaded bushing 22 having a shoulder 23 at its upper end which is brought into close liquid-tight engagement with the base of the container by the nut 24. The lower end of the shaft 21 in the embodiment shown is made hollow and the interior is splined for engagement with the coupling. The motor shaft 14 is threaded at 25 for engagement with the opposite end of the coupling.

Referring now more particularly to Fig. 2 of the drawings, wherein is shown in greater detail the construction of the coupling of the present invention, it will be seen that it consists of two connecting members A and B. The upper end 30 of the connecting member A is of generally circular cross section and splined so as to be insertable into the hollow end of the agitator drive shaft 21 to form a driving connection. The nose 30a may be tapered to facilitate the fitting together of shaft 21 and member A. The lower end 31 of the connecting member B is tapped to receive the threaded end 25 of the motor drive shaft 14. A left-hand thread is utilized in the specific embodiment to cause the connection to tighten in the direction of motor rotation.

The upper end 32 of the connecting member B is reduced in cross section to provide an upwardly facing shoulder at 33. The reduced portion 32 has a transverse slot 34 in which is received a tongue 35 made integral with the lower end of the coupling member A. Intermediate the splined end 30 and the tongue 35 of member A is an annular flange 36 forming a shoulder facing the shoulder 33 previously referred to.

The tongue 35 has a transverse bore 37 through which extends a pin 38 received through openings 39 and 40 in the slotted end portion 32. The transverse bore 37 is of substantially greater cross section than the pin 38 so that the coupling member A not only may pivot about the axis of the pin 38 but also may tilt in an axial plane relative thereto, thus providing a limited universal connection between the coupling members A and B.

Disposed on the shoulder 33 is a guard 41 forming a conical skirt about the lower portion of the coupling member B and having a flange 41a resting on shoulder 33 which, in effect, forms an annular extension of shoulder 33.

In accordance with the invention, there is seated between the shoulder 36 and the shoulder 33 a relatively thick annular ring or sleeve 42 of resilient material such as rubber, hereinafter referred to as rubber-like material which acts as a stabilizer and damper for the coupling, particularly when the mixer is driven at idling speeds. The resilient ring or sleeve 42 encompasses the limited universal coupling between the connecting members A and B and urges the members A and B into alignment and resiliently resists and absorbs any tilting movement of one of the connecting members relative to the other.

As will be apparent, the coupling members A and B are easy and simple to fabricate and the connection of the two together merely by inserting the pin 38 may be accomplished in a simple and easy manner. Thereafter, the resilient rubber ring or sleeve 42 may be easily seated in place by forcing the same over the flange 36. When in seated position, as shown in Figs. 2 and 3, the ring or sleeve 42 snugly embraces the slotted end portion 32 and tongue 35 and covers the openings 39 and 40.

By the use of the coupling of the present invention, it is possible to engage and disengage the agitator shaft of the mixer from the coupling without difficulty despite minor misalignment of the motor shaft and agitator shaft and at the same time the device may be operated throughout its entire range of speed without undesirable vibration and noise.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A coupling comprising a pair of connectors constructed and arranged for attachment respectively to a pair of substantially aligned shafts, means forming a universal joint between said connectors including a bifurcated end piece on one connector and a tongue on the second connector received in the said bifurcated end piece and a transverse pivot pin carried by the bifurcated end piece and extending through the tongue, the ends of said pin terminating within the confines of said bifurcated end piece and said tongue being provided with a transverse opening of greater diameter than the pin to permit limited universal movement of one connector relative to the other, a pair of opposed shoulders on the connectors at opposite ends of the universal joint and a thick cylindrical stabilizing sleeve of resilient rubber-like material seated between said shoulders and snugly embracing the tongue and bifurcated end piece and extending about the ends of the pin for damping movement of the connectors relative to each other and for retaining the connectors in interconnected relation.

2. A coupling comprising a pair of connecting members, each having means at one end for releasable attachment of the coupling to a shaft, the other ends of said connecting members being provided with loosely interfitting axially extending portions forming a driving connection therebetween, said interfitting portions having apertures extending therethrough of different sizes and said interfitting portions forming a generally cylindrical central portion of the coupling, a shoulder on each member facing inwardly toward said cylindrical central portion, a pin received in said apertures and having its ends terminating within said interfitting portions for preventing axial separation of the members said pin having a cross-section commensurate with the smaller of said apertures, and a relatively thick cylindrical sleeve of resilient rubber-like material disposed between said shoulders encircling said central portion of the coupling to stabilize the same and overlying the ends of said pin to retain said pin within said apertures.

OSCAR M. ANDERSON.

References Cited in the file of this patent

UNITED STATES PATENTS

| Number | Name | Date |
|---|---|---|
| 1,324,898 | Hopcraft | Dec. 16, 1919 |
| 1,357,553 | Geer | Nov. 2, 1920 |
| 2,451,791 | Weaver | Oct. 19, 1948 |
| 2,554,311 | Place | May 22, 1951 |

FOREIGN PATENTS

| Number | Country | Date |
|---|---|---|
| 391,949 | Germany | 1924 |